United States Patent
Martyak

(10) Patent No.: US 8,562,858 B2
(45) Date of Patent: Oct. 22, 2013

(54) PROCESS FOR THE POLYMERIZATION OF VINYL CHLORIDE

(75) Inventor: Nicholas M. Martyak, Doylestown, PA (US)

(73) Assignee: Taminco, Ghent (BE)

( * ) Notice: Subject to any disclaimer, the term of this patent is extended or adjusted under 35 U.S.C. 154(b) by 0 days.

(21) Appl. No.: 13/145,252

(22) PCT Filed: Jan. 20, 2010

(86) PCT No.: PCT/EP2010/050636
§ 371 (c)(1),
(2), (4) Date: Sep. 21, 2011

(87) PCT Pub. No.: WO2010/084130
PCT Pub. Date: Jul. 29, 2010

(65) Prior Publication Data
US 2012/0004382 A1    Jan. 5, 2012

Related U.S. Application Data

(60) Provisional application No. 61/146,067, filed on Jan. 21, 2009.

(51) Int. Cl.
*C08L 27/06* (2006.01)
*C08K 5/13* (2006.01)

(52) U.S. Cl.
USPC ...... 252/182.29; 524/323; 524/340; 524/349; 524/291

(58) Field of Classification Search
USPC .............. 252/182.29; 524/323, 340, 349, 291
See application file for complete search history.

(56) References Cited

U.S. PATENT DOCUMENTS

| | | | | |
|---|---|---|---|---|
| 3,814,821 A | * | 6/1974 | Oliver et al. | 426/265 |
| 4,361,683 A | * | 11/1982 | Dodd et al. | 526/84 |
| 4,749,757 A | | 6/1988 | Schram et al. | |
| 5,561,182 A | * | 10/1996 | Baker et al. | 524/394 |
| 7,309,729 B1 | | 12/2007 | Weese et al. | |
| 2004/0132930 A1 | | 7/2004 | Bonardi et al. | |

FOREIGN PATENT DOCUMENTS

| | | |
|---|---|---|
| EP | 1 176 156 A1 * | 1/2002 |
| EP | 1176156 A1 | 1/2002 |
| EP | 1698642 A1 | 9/2006 |
| GB | 971753 A | 10/1964 |
| WO | 03/093330 A1 | 11/2003 |

OTHER PUBLICATIONS

International Search Report for International Application No. PCT/EP2010/050636, dated Feb. 19, 2010.

* cited by examiner

*Primary Examiner* — Robert D. Harlan
(74) *Attorney, Agent, or Firm* — Sughrue Mion, PLLC

(57) ABSTRACT

In a process for the aqueous suspension polymerization of vinyl chloride, alone or in mixture with other monomers, in the presence of at least one of dialkylperoxydicarbonate, peroxyester and diacyl peroxide, the polymerization composition according to the invention comprises at least one dialkylhydroxylamine as a shortstopping agent along with a totally or partially hindered phenolic antioxidant.

16 Claims, No Drawings

PROCESS FOR THE POLYMERIZATION OF VINYL CHLORIDE

CROSS REFERENCE TO RELATED APPLICATIONS

This application is a National Stage of International Application No. PCT/EP2010/050636, filed Jan. 20, 2010, which claims priority from U.S. Patent Application No. 61/146,067, filed Jan. 21, 2009, the contents of all of which are incorporated herein by reference in their entirety.

The invention relates to an aqueous suspension polymerization process for producing polymeric, esp., polyvinyl chloride (PVC) and co-polymers of PVC and PVDF, products with improved color, the process utilizing combinations of an N substituted hydroxylamine shortstopper with certain totally or partially hindered phenolic antioxidants.

In the manufacture of polyvinyl chloride, it is important commercially to obtain the best yield and quality at the lowest cost. The cost and performance of the peroxide initiators, shortstopping agent and antioxidant, if used, can be significant factors. Ideally, PVC should be produced with effective, cheap, non-toxic, shortstopper. There are many shortstopper to choose from but those based on hydroxylamines may lead to yellowing of the PVC resin. This is particularly true if certain peroxide radicals used in the polymerization process are high enough in energy to abstract a hydrogen atom from the PVC backbone leading to dehydrochlorination.

Di 2-ethyl hexylperoxydicarbonate and di(sec-butyl) peroxydicarbonate are two common and inexpensive initiators which work well but produce PVC with poor color.

The most commonly used short-stoppers for the aqueous suspension polymerization of vinyl chloride are ATSC (acetone thiosemicarbazone), bisphenol A, sodium nitrite, alpha methyl styrene, butylated hydroxyanisole, Irganox® 245 (2,4dimethyl6-sec-hexadecylphenol), alone or as a mixture with Irganox 1076 [octadecyl 3-(3,5-di-tert-butyl-4hydroxyphenyl)propionate] and diethylhydroxylamine.

Irganox® 1141 (hereinafter IGX 1141) is a commercial mixture of 80 parts by weight of Irganox® 245 and of 20 parts by weight of Irganox® 1076. However. these shortstoppers all have some drawback: poor water solubility, slow to stop polymerization, toxicity/handling issues.

N,N-diethylhydroxylamine (DENA), a representative substituted hydroxylamine compound, has been used in PVC production as a vinyl chloride stabilizer, as a "killer" to stop runaway reactions, as an antiscalant, and when added prior to initiation at low levels, to modify PVC density (sometimes referred to as "stunning" the initiator) or to prevent unwanted polymerization during the induction period.

Hydroxylamine compounds are also known in the industry as PVC shortstoppers; however, most tests indicated that DEHA caused yellowing of the polymer.

U.S. Pat. No. 3,222,334, (Dec. 7, 1965) discloses in the specification that N,N-dialkylhydroxylamines may be used to stop emulsion polymerization of vinyl chloride.

However, no examples are given, and no advantage is noted. The reference suggested that dialkylhydroxylamines have a "non-toxic and non-discoloring nature", but this is in reference to use with various rubbers, and the distinction may be drawn between non-discoloring and stabilization of color; the former suggests non-involvement in color formation whereas the latter implies an interference in color-producing processes.

WO 98151714 discloses the use of ethylhydroxylamine as a shortstopping agent for free radical polymerization. However, novelty is claimed through the allegedly "surprising non-volatility" of ethylhydroxylamine, as well as its low corrosivity and water solubility. However this patent, while claiming use for all free radical polymerizations, discusses only emulsion polymerization of rubbers, and all the examples address comparisons related to such processes.

U.S. Pat. No. 4,749,757 includes the use of DEHA (and other polymerization inhibitors) in conjunction with PVA (a suspension agent) to simultaneously increase the density and porosity of PVC by maintaining a low concentration (5-10 ppm preferred) in the reactor. However, DEHA is not disclosed as a shortstopper for PVC.

In JP 02235912, Kanolo et al describe a "reaction product of DEHA, cyclopentadiene, and pyrogallol" which when applied to reactor walls prevents the formation of scale. This relates to a known application which exploits the properties of hydroxylamines as part of a coating to impart antiscaling properties to the walls of PVC reactors.

U.S. Pat. No. 6,340,729 describes the use of DEHA with selected organic peroxide initiators to improve color and heat stability of the PVC resin. This patent compares the use of DEHA with other common shortstoppers and discusses that an excess of the shortstopping agent, diethylhydroxylamine will lead to yellowing of the resin.

It is also known in the art to use DEHA as a "kill" agent, to halt runaway vinyl chloride polymerization. Due to DEHA's excellent solubility and thus rapid miscibility in water, it is effective in halting vinyl chloride polymerization when, for example, an unexpected power outages or if mechanical issues arise.

In accordance with the present invention, it has been discovered that combinations of at least one substituted hydroxylamine shortstopper with totally or partially hindered phenolic antioxidants provide excellent polymerization kinetics and a rapid, efficient shortstopping, resulting in high yields of high-quality polymer at low cost and minimal change in color. The overall cost of PVC production is reduced by using a hydroxylamine and lower concentrations of totally or partially hindered phenolic antioxidants. When vinyl chloride resin derived from the described process is compounded, the thermal stability and color of the product is sometimes found to be improved over resin which has been made with only a substituted hydroxylamine shortstopper and no antioxidant.

Another aspect of the invention relates to the process which provides excellent polymerization kinetics and a rapid, efficient shortstopping, resulting in high yields of high-quality polymer at low cost by the use of combinations of alkyl substituted hydroxylamine shortstopper with totally or partially hindered phenolic antioxidants and when using dialkyl peroxydicarbonates, peroxy-tert-alkanoates and diacyl peroxides initiators.

In another aspect of the invention for the aqueous suspension polymerization of vinyl chloride, alone or as a mixture with another vinyl monomer, the polymerization initiator comprises at least one compound chosen from dialkyl peroxydicarbonates, peroxy-tert-alkanoates and diacyl peroxides and use is made, as agent for halting the polymerization, of a mono- or dialkylhydroxylamine, each alkyl radical of which comprises from 1 to 4 carbon atoms. The resins thus obtained exhibit excellent whiteness.

It has now been found that the combination of an initiating system comprising at least one compound chosen from dialkyl peroxydicarbonates, peroxy-tert-alkanoates and diacyl peroxides and of a polymerization short-stopper composed of a mono- or di-alkyl N substituted hydroxylamine and one or more totally or partially hindered phenolic antioxidants makes it possible not only to efficiently stop the polymerization but also to obtain, at the same time, a PVC or copolymer resin resulting in materials exhibiting excellent heat stability or whiteness. Furthermore, in comparison with conventional short-stoppers, mono- and dialkyl substituted hydroxylamines exhibit the advantage of being instantaneously dilutable in water at the working concentrations without the addition of stabilizer or flammable solvent such as methanol.

The expression totally or partially hindered phenolic antioxidants as used in this context has the meaning as generally accepted by those skilled in the art, i.e. phenolic molecules involving the proximity of adjacent groups to the phenolic hydroxyl which are large and/or bulky and tend to hinder the reactivity of the phenolic hydroxyl group (hinder the phenolic group from exerting its influence as an antioxidant and form R—O. free radicals). The reasoning behind this is that the large adjacent groups to the hydroxyl group:
1) prevent the formation of the free radical: R—O—H—R—O.+H., and/or
2) if the free radical does form on the hindered phenolic compound, R—O., the peroxide free radical, also a large molecule, used to initiate the polymerization may be too large itself to be able to react with the hindered phenolic free racidcal due to the adjacent large bulkly groups. If the is peroxide free radical are not 'neutralized' or destroyed by the hindered phenolic free radical, they are still too active in the suspendion (or even in the resin if occluded during the drying step) leading to dehydrochlorination of PVC and eventual yellowing of the resin.

Therefore, the only way to compensate for the inability of the partially or totally hindred phenoilic molecules, in the absence of a hydroxylamine, is to 'overdose' the PVC reactor to ensure there is sufficient concentration of the phenolic compound to destroy all residual organic peroxide initiator molecules. It is common practice if using a partially or totally hindered phenolic antioxidant alone to use approximately 300-750 ppm. Using these high concentrations, to ensure total destruction of the peroxide free radical, leads to higher production costs.

In addition, using only an antioxidant may never lead to complete termination of the polymerization reaction leading to variability in the quality of the PVC resin.

A subject-matter of the invention is thus a process for the aqueous suspension polymerization of vinyl chloride, alone or as a mixture with less than 50% of another vinyl monomer, in the presence of a polymerization initiator comprising at least one compound chosen from dialkyl peroxydicarbonates, peroxy-tert-alkanoates and diacyl peroxides, characterized in that the polymerization formulation contains at least one or more totally or partially hindered phenolic antioxidants, and in that the polymerization reaction is halted or shortstopped using a polymerization regulating agent (or short-stopper) comprising mono- or di alkyl substituted N hydroxylamine, in which each alkyl radical comprises from 1 to 4 carbon atoms,
in the amount of 0.0005 to 0.1 parts by weight per 100 parts by weight of monomers.

The stated combination of at least one mono- or di alkyl substituted N-hydroxylamine along with a totally or partially hindered phenolic antioxidant, according to the invention, provides very effective polymerization regulating agents with a surprising synergetic action of the specific hydroxylamines and the specific phenolic antioxidant.

A further subject matter of the invention is also a polymerization regulating agent comprising the stated synergetic combination of at least one such mono- or di alkyl substituted N hydroxylamine along with a totally or partially hindered phenolic antioxidant.

The oil-soluble initiating system generally used is composed of one or more radical-generating compounds which trigger the polymerization of the monomer component. These radicals generally result from the thermal decomposition of diacyl peroxides, or dialkyl peroxydicarbonates or of peroxy-teri-alkanoates. It is industrial practice to express the amount of initiator(s) introduced into the reaction mixture by the overall content of active oxygen capable of being released by the initiating system. The total amounts of active oxygen generally used are between 0.0005 and 0.01 parts by weight, preferably between 0.0015 and 0.005 parts by weight, per 100 parts by weight of monomer component. It is also possible to use a mixture of peroxide initiators each having different half-lives for a given temperature, the proportion of one with respect to the other can range from 1 to 99% by weight, preferably from 10 to 90%. At an identical temperature, the greater the concentration of the initiator(s), the faster the polymerization kinetics. Similarly, for a given polymerization time, the higher the reaction temperature, the faster the polymerization kinetics.

The commercial process of VCM polymerization is typically done in a batch mode and it is generally desirable to stop the polymerization after having reached a predetermined degree of VCM conversion, so as to obtain a stable and uniform polymer. Typically conversions is about 60% to 85%.

In dialkyl peroxydicarbonates, each alkyl radical can comprise from 1 to 16 carbon atoms and can be linear, branched or cyclic. Mention may be made, as non-limiting examples of such dialkyl peroxydicarbonates, of diethyl, diisopropyl, di-n-propyl, dibutyl, dicetyl, dimyristyl, di(4tert-butylcyclohexyl) or di(2-ethylhexyl) peroxydicarbonates. Preference is given to peroxydicarbonates in which each alkyl radical comprises from 6 to 16 carbon atoms and more particularly to di(2-ethylhexyl) peroxydicarbonate.

The dialkyl peroxydicarbonates used according to the invention are classified in the family of rapid initiators. They generally have a half-life of 1 hour at approximately 67° C. and can thus be used for vinyl chloride polymerization temperatures of between 50 and 70° C.

It is also possible to use, as non-limiting examples of very rapid initiators from the family of the peroxy-tertalkanoates, of 1,1-dimethyl-3-hydroxybutyl peroxyneodecanoate, curry] peroxyneodecanoate, 1,1,3,3tetramethylbutyl peroxyneodecanoate and 1,3-di(2neodecanoylperoxyisopropyl)benzene. The very rapid peroxy-tert-alkanoates generally have a half-life of 1 hour at approximately 53-61° C.

The N-substituted hydroxylamines have the following structure formula:

wherein $R^1$ and $R^2$ may be the same or different, and are selected from H and $C_1$-$C_{12}$ hydrocarbons, where each hydrocarbon chain may be branched, unsaturated, or have hydrogen substituted with functional groups selected from —OH, —SO, benzyl, amino, mercapto, keto, carboxyl, or where $R^1$ and $R^2$ may form together a cyclic structure (such as in piperidinyloxy compounds), with the proviso that at least one of $R^1$ and $R^2$ is different from H.

The substituted hydroxylamine used according to the invention as polymerization short-stopper is introduced at between 60 and 90% of conversion by mass, preferably between 65 and 80%, from the time when the pressure is seen to drop in the reactor. The amount of mono- or dialkylhydroxylamine to be used can range from 0.0005 to 0.1 parts by weight and is preferably between 0.001 and 0.05 parts by weight per 100 parts by weight of monomer component.

The polymerization short-stopper according to the invention is preferably chosen from dialkylhydroxylamines, the more particular preferred dialkylhydroxylamine being N,Ndiethylhydroxylamine, due to its water solubility, high efficiency, and commercial availability.

The polymers which may be made by the process of this invention include but are not limited to polyvinyl chloride, so polyvinylidene fluoride, polyvinylfluoride, and PTFE.

The term "aqueous suspension polymerization" is understood to mean a polymerization carried out in the presence of at least one oil-soluble initiator, the monomer component (vinyl chloride, alone or as a mixture with another vinyl's monomer) being dispersed by mechanical means in an aqueous medium comprising at least one suspending agent.

The proportion of vinyl chloride in the monomer component is at least 50% by weight, preferably greater than 80%. The vinyl monomers which can be copolymerized in an aqueous suspension with vinyl chloride are well known and mention may be made, as non-limiting examples, of vinyl esters, such as vinyl acetate, vinylidene halides, such as vinylidene chloride and vinylidene fluoride, acrylic esters, such as butyl acrylate, and methacrylic esters, such as methyl methacrylate.

Dispersing or suspending agents generally used in suspension polymerization are known protective colloids, for example water-soluble polymers, such as polyvinyl alcohols, polyethylene oxides, water-soluble cellulose derivatives, such as so methylcellulose, polyvinylpyrolidone, gelatin and vinyl acetate/maleic anhydride copolymers. These suspending agents can be used alone or in the form of mixtures in amounts generally of between 0.01 and 0.5 parts by weight, preferably between 0.04 and 0.2 parts by weight, per 100 parts by weight of monomer component.

A system for buffering the pH of the aqueous medium may be used if desired by the PVC producer. For example, the pH of the aqueous medium is about 6-7 at the start of the reaction but may drop to as low as 3.5 due to the production of hydrochloric acid. It is preferred, but not necessary in the scope of this invention to buffer the aqueous suspension. Typical buffering components include but are not limited to those containing, carbonate or bicarbonate, phosphates or citrates. The buffering pH range is between 5 to 8 and preferably between 5.5 to 7.5.

According to the present invention, an antioxidant is added to the polymerization medium, either at the start of the reaction or at the desired conversion. The antioxidant may also be fed slowly and continually into the PVC reactor during the course of the polymerization reaction. The antioxidants are chose such that they contain a partially of totally hindered phenolic group. Representative antioxidants include, but are not limited to, butylated hydroxyanisole, butylated hydroxytoluene, Ciba's Irganox 1076, Ciba's Irganox 245, Schenectady Chemical's Isonox 132 (2,6-di-tert-butyl-4-sec-butylphenol). The amount of the antioxidant can vary from 10 to 1000 is ppm and more preferably from 25 to 300 ppm.

The aqueous suspension polymerizations of vinyl chloride or of a monomer component based on vinyl chloride are generally carried out between 45 and 80° C., preferably between 50 and 70° C., which makes possible a very wide use of various peroxide initiators. However, when the chosen polymerization temperature is not very high (between 30 to and 50° C.), it may prove useful to employ a combination of initiators having different half-lives at the chosen temperatures, for example comprising a dialkyl peroxydicarbonate and an initiator from the family of the very rapid peroxy-tert-alkanoates, or a combination of initiators from the family of the peroxy-tert-alkanoates comprising a rapid peroxy-tert-alkanoate and a very rapid peroxy-tert-alkanoate.

When the chosen polymerization temperature is slightly higher (between 55 and 65° C.), it may prove useful to employ a combination of initiators having different half-lives at the chosen temperatures, for example comprising a dialkyl peroxydicarbonate and an initiator from the family of the rapid peroxy-tert-dialkanoates, or a combination of rapid peroxy-tert-alkanoates.

The process according to the invention can be carried out in a way known per se consisting, for example, in dissolving a protective colloid in an aqueous medium or a monomer component in dispersing the oil-soluble polymerization peroxide initiator in the aqueous medium or in dissolving it in the monomer component, and optionally in dissolving a system for buffering the pH of the aqueous medium. The traces of oxygen arc removed, so as to have a residual content of oxygen dissolved in the water of between 0.0005 and 0.05 parts by weight, preferably between 0.001 and 0.02 parts by weight, per 100 parts by weight of water. The monomer component is subsequently introduced into the reactor and then the reaction mixture is stirred and brought to a temperature of between 45 and 80° C., preferably is between 50 and 70° C.

The polymerization is brought to an end by depletion of the liquid monomer phase and this is reflected by a modification in the monomer liquid/vapor equilibrium and a fall in pressure is observed. At the beginning of the fall in pressure, the conversion by mass of monomer is in the region of 65-85%.

At the end of the desired conversion, the shortstopper is injected into to reactor to destroy or make inactive any residual peroxide initiator molecules.

Once the polymerization is complete, the polymer formed is separated from the aqueous medium and then it is drained and dried. It generally exists in the form of particles with a particle size of the order of 80 to 250 micrometers.

In a preferred embodiment of the present invention, vinyl chloride is polymerized in a suspension such as is well known to those skilled in the art, using an amount of peroxydicarbonate initiator (or mixture of initiators including peroxydicarbonate and a "fast" perester) optimal to the conditions and reactor, and the suspension is shortstopped s by a calculated amount of alkylhydroxylamine, based on an empirical relationship, during pressure drop.

In a more preferred embodiment the peroxide used at higher processing temperatures is di-2ethylhexylperoxydicarbonate, the alkylhydroxylamine is N,N-diethylhydroxylamine (DEHA) and the phenolic portion of the antioxidant is totally or partially hindered.

In the present invention we have found that both DEHA and a phenolic antioxidant provide a superior heat stable resin when compared to those resins using only a hydroxylamine shortstopper particularly the polymerization process uses di-2-ethylhexylperoxydicarbonate as one of the initiators.

In the method of the present invention, the substituted hydroxylamine is used as a shortstopper at the end of the reaction, and the antioxidant may be added at the start of the polymerization process or along with the hydroxylamine shortstopper.

The following examples are illustrative of the invention but are not intended to be exhaustive or to limit the invention to the precise form disclosed. Many other variations and modifications are possible in light of the specification and examples.

EXAMPLE 1

Synthesis Method for Producing S-PVC (Suspension Process)

A 2-gallon reactor made by American Reactor Corporation (New Carlisle, Ohio) was used.

The polymerization of VCM was done as follows:
1. Coat inside of reactor with antifoulant
a. Rinse reactor and stirrer with water to remove excess antifoulant
2. Add 5000 ml water to reactor
3. Add primary and secondary dispersants to reactor water
4. Add to reactor peroxides: front-end initiator, α-cumyl peroxneodecanoate added at 410 ppm. The back-end initiator was [di-2-ethylhexyl peroxydicarbonate] and added at 760 ppm.
5. Antioxidant (AO) added here if necessary; AO addition—not used in pH study
6. Seal reactor
a. Set stirrer to 400 rpm
7. Charge 3632 grams (8 lbs.) VCM into reactor
8. Heat to 58° C.
9. Monitor pressure and temperature
a. Pressure stabilizes ~8.3 bar (120 psi) and temperature about 58° C.
10. Continuously add 7 ml/min water to reactor over 2.5-3.0 hour polymerization timeframe (~1150 ml in total)
11. When the pressure starts to drop from about 8.3 bar (120 psi) to 7.58 bar (110 psi), DEHA (or $NaHCO_3$) is added to an injection port on reactor.
a. Addition of $NaHCO_3$ done at this step in the pH study only; prior to the addition of DEHA.
b. After the addition of DEHA to the injection port, a pressurized nitrogen cylinder is attached to the same injection port that contains the DEHA.
c. The pressure in the reactor continues to slowly drop and when it reaches 6.8 bar (99 psi; Δ20 psi), the cylinder is charged with 15 bar (220 psi) of $N_2$ gas.
d. An inlet valve connecting the reactor to the $N_2$ cylinder is opened and the differential in pressure between the $N_2$ cylinder (15 bar; 220 psi) and that in the reactor (6.8 bar; 99 psi) causes the flow of $N_2$ and the DEHA into the reactor.
e. The valve on the reactor:$N_2$ cylinder is closed and the $N_2$ cylinder re-pressurized to 15 bar (220 psi).
f. Again, the inlet valve connecting the $N_2$ cylinder to the reactor is opened and the second $N_2$ stream enters the reactor—this is is done to ensure all the DEHA is in the PVC reactor.
g. The inlet value is closed and the cylinder disconnected.
h. The inlet port is filled with water (~5 ml), the $N_2$ cylinder reattached, pressurized and this water is then washed with any remaining DEHA into the reactor.
12. At this point in the process, the pressure in the cylinder is still about 6.8 bar (99 psi).
13. The DEHA (and if necessary for pH adjustment, $HCO_3^-$) is mixed with the heated slurry at 400 rpm for approximately 1-2 minutes before going to VCM recovery.
14. Recovery of VCM
a. Unused VCM from the reactor is removed when the pressure drop is 1.38 bar (20 psi) from steady-state. Appropriate reactor values are open to draw out any unused VCM and this is sent to the general VCM recovery in the plant.
i. The pressure within the reactor drops to ambient. A $N_2$ stream (0.7 bar; ~10 psi) is inserted into the reactor and sweeps through the reactor and PVC slurry.
ii. The temperature of the steam jacket surrounding the reactor is set to 90° C. (195° F.) and the temperature of the PVC slurry reaches about 82° C. (181° F.). This additional heat, $N_2$ stream and constant stirring assist in removing unused VCM from the PVC suspension and water. Heating the slurry to 90° C. also helps to destroy residual peroxide free radicals. This recovery process takes one hour.
b. After one hour of $N_2$ purging, the $N_2$ stream is removed, heat removed from the reactor jacket and agitation stopped. The PVC slurry is immediately removed using a drainage value at the bottom of the reactor, filtered and bagged. The pH of the centrate water (water removed via filtration) is measured.
15. PVC (Wet Cake)
a. The wet PVC (about 4000 grams; 3625 grams from VCM plus additional water in the wet cake) is taken to the laboratory for drying. Some fraction of the PVC is lost as it sticks to the walls of the reactor (about 10% loss).
b. 800 gram fractions of the wet-cake are placed in a drying vessel (large cup) that has a fine mesh screen located at the bottom. Three fractions are dried simultaneously whereby hot 95° C. (202° F.) air is flowing through the resin. The resin continuously mixes the resin in a fluidized bed process for 45 minutes. When dried, the resin is removed from the drying vessels.
c. Typical resin weights after drying are about 2400 grams/batch. This represents about 65% recovery from the initial weight of the VCM. Loss of PVC resin is seen from: a) residual PVC remaining in the reactor and on the stirrer, b) in the transfer containers.
d. The resin is then tested for particle size distribution and heat stability.

EXAMPLE 2 (COMPARATIVE EXAMPLE)

This example shows the poor termination of S-PVC using DEHA alone.

One potential method to study the effectiveness of the termination of the polymerization reaction by DEHA is to monitor the change in pressure with time at the conclusion of the reaction. As the VCM in the slurry is consumed during the suspension reaction, more VCM from the headspace enters the suspension thus decreasing the reactor pressure. Typical pressure drop (ΔP) is about 1.4 bar (20 psi) over a 25-33 minute (Δt) timeframe leading to a ΔP/Δt of about 0.05 bar/min (0.6-0.8 psi/min). Smaller ΔP/Δt slopes indicate easier reaction termination, less PVC-polymer or peroxide radicals in the suspension, thus leading to slower than average transfer of VCM from the headspace into the slurry. The lower free radical concentration is likely due to the interactions (termination) of the antioxidants with either the peroxide or PVC free radicals.

Pressure-time transients were recorded for each of the four runs detailed in the table below; a typical P-t curve is seen below. The results are:

| Effects of DEHA/pH Pressure Drop | DEHA (ppm) | |
| --- | --- | --- |
| (psi/min) | 25 | 100 |
| pH 3.5 | 0.772 | 0.720 |
| pH 6.8 | 0.714 | 0.643 |

It is seen the pressure drop vary from 0.643 to 0.772 with the fastest termination at the higher pH and highest DEHA concentration.

EXAMPLE 3 (COMPARATIVE EXAMPLE)

This example shows the effects of combining DEHA with butylated hydroxy toluene (BHT) as totally hindered phenolic antioxidant (AO). The same process as detailed above was used to produce the S-PVC resin but the BHT was added as seen in the table. The pH of the suspension was approximately 3.5.

| Effects of BHT Pressure Drop | DEHA (ppm) | |
|---|---|---|
| (psi/min) | 25 | 100 |
| 50 ppm AO | 0.424 | 0.405 |
| 250 ppm AO | 0.303 | 0.273 |

It is seen that the combination of DEHA with the antioxidant results in faster termination,

EXAMPLE 4 (COMPARATIVE EXAMPLE)

This example shows the termination of S-PVC using a long-chained substituted hindered phenolic antioxidant. Irganox 1076 from Ciba Corporation was used along with DEHA. The pH of the suspension was approximately 3.5:

| Effects of 1076 Pressure Drop | DEHA (ppm) | |
|---|---|---|
| (psi/min) | 25 | 100 |
| 50 ppm AO | 0.409 | |
| 250 ppm AO | 0.326 | 0.268 |

Even faster termination kinetics were obtained using DEHA with this long-chained antioxidant.

EXAMPLE 5 (COMPARATIVE EXAMPLE)

This example shows the termination of S-PVC using a long-chained substituted partially hindered phenolic antioxidant. ADDIOX 1045 obtained from American Dispersion (Louisville, Ky.) was used along with DEHA. The pH of the suspension was approximately 3.5:

| Effects of 1045 Pressure Drop | DEHA (ppm) | |
|---|---|---|
| (psi/min) | 25 | 100 |
| 50 ppm AO | 0.341 | 0.315 |
| 250 ppm AO | 0.287 | 0.250 |

The small ΔP/Δt slopes using a partially hindered phenol along with DEHA show indicate rapid termination kinetics.

EXAMPLE 6 (COMPARATIVE EXAMPLE)

This example shows the relative heat stability of resin produced using only DEHA at various pHs Resin Heat Stability—Brabender Studies The heat stability of the compounded resin was determined by first blending the resin as follows: 2000 grams of PVC resin+12 grams T-172 (Arkema's Thermolite® 172 is a butyl-tin mercaptide)—mixed at room temperature. After mixed, add 16 grams calcium stearate (15F from Ferro Corp.) and 4 grams AC-629 (polyethylene wax) and 25 grams XL-165 (Petrac 165 wax from Ferro Corp.). The mixture was blended for approximately 5 minutes at 60° C. Finally, 40 grams UFT (filler—$CaCO_3$) is added and blended at 85° C. and this mixture is then added to the Brabender.

The compounded resin was put into a Brabender and mixed at 175° C. but the temperature within the Brabender was actually 200° C. due to additional frictional heating (see graph below showing torque and temperature profiles). Samples were pulled every five minutes (note drop in torque every five minutes as Brabender was stopped to remove sample) and pressed onto a piece of paper.

Data from the Brabender was qualitatively ranked according to color from 10 (white) to 7 (yellow) to 5 (brown) to 1 (black). Samples were pulled every five minutes up to 35 minutes and pressed onto a sheet of paper. Typical times for compounded PVC in an extruder is about 10 minutes. To better quantify the effects of heat stability on resin color, plots of whiteness vs. time were made from 0-15 minutes and 0-20 minutes to ensure we bracketed the time the PVC resin would see in the extruder.

To compare one sample to another, a "standard" was chosen. Results of various runs from the trial are compared to this standard using this percent difference formula:

(whiteness-time slope of trial run−whiteness-time slope of standard)/whiteness-time slope of standard×100%

A positive percent difference indicates the trial sample had a steeper slope value compared to the standard sample indicating less heat stability for that sample vs. the standard sample. A negative percent difference indicates the sample from that trial had a smaller whiteness-time slope compared to the standard sample reflecting better heat stability versus the standard.

Effects of DEHA with pH

The first heat stability study investigated the effects of slurry pH with DEHA concentrations (no antioxidant). The pH of the slurry decreases from about pH 6.8 (make-up water) to about 3.5 due to HCl production during the polymerization reaction. Some PVC producers buffer the slurry whereas others use no buffer. [Facilities using nitrite as the shortstopper cannot buffer the suspension as nitrite is not effective about a pH ~4.5].

In calculating the results from the Brabender, it is assumed that the 100 ppm DEHA/pH 3.5 sample is a typical standard formulation without an antioxidant according to the state of the art. As mentioned above, a negative slope value reported below indicates the slope of the whiteness time curve for a given sample is better than the control—better heat stability.

Results from the Brabender plots of the change in compounded PVC color (10=white; 5=yellow and 1=black) during extrusion indicate: 1) the higher the pH of the slurry and 2) the lower concentration of DEHA allows for better heat stability (whiteness):

| Effects of pH | DEHA (ppm) | |
|---|---|---|
| (20 min Brabender) | 25 | 100 |
| 3.5 | −17.86% | 0.00% |
| 6.8 | −28.57% | −17.86% |

At 100 ppm DEHA, increasing the slurry pH from 3.5 to about 6.8 increases the color stability. At constant pH, lowering the DEHA concentration from 100 to 25 ppm also increases the color stability and the best result is seen at high pH and low DEHA concentration.

EXAMPLE 7 (COMPARATIVE EXAMPLE)

This example shows the poor performance of PVC samples produced in Example 6 (using DEHA without an antioxidant) when compared against a commercial-grade PVC resin using an antioxidant (approximately 300 ppm) and shortstopped using a molecule other than DEHA.

| Effects of pH | DEHA (ppm) | |
|---|---|---|
| (20 min Brabender) | 25 | 100 |
| 3.5 | +31.44% | +57.22% |
| 6.8 | +12.40% | +24.40% |

It is seen the slopes of the whiteness vs. time for the samples produced using DEHA and no antioxidant are much steep than the whiteness vs. time slope for the commercial-grade resin.

EXAMPLE 8 (ACCORDING TO THE INVENTION)

This example shows the benefits of using DEHA and BHT as an antioxidant compared to commercially acceptable PVC resin. PVC was produced at a commercial facility using a standard formulation incorporating approximately 300 ppm of an hindered antioxidant and a shortstopper other than DEHA. This is now considered the 'control' formulation against which results from DEHA and BHT are compared to.

The addition of 50 or 250 ppm BHT (as active material) along with DEHA results in a much better quality resin compared to the resin produced without an AO as seen in Example 6. Again, results are now compared against a commercially acceptable PVC resin. The addition of only 50 ppm ADDIOX 1005 (BHT) produced almost similar heat stable resins at 25 and 100 ppm DEHA. In fact, as little at 50 ppm BHT as an antioxidant can produce a commercially acceptable resin.

| Effects of BHT | DEHA (ppm) | |
|---|---|---|
| (20 min Brabender) | 25 | 100 |
| 50 ppm AO | 15.00% | 10.00% |
| 250 ppm AO | −30.00% | 0.00% |

EXAMPLE 9 (ACCORDING TO THE INVENTION)

This example shows the benefits of using a long-chained aliphatic antioxidant along with DEHA on color stability.

The addition of 50 ppm ADDIOX 1016 to the suspension along with DEHA produces a heat stable resin that is very similar to the commercial grade resin that needed 300 ppm of the antioxidant. In fact, at 250 ppm ADDIOX 1016 and 100 ppm DEHA, a superior heat stable resin is seen.

| Effects of ADDIOX 1016 (Irganox1076) | DEHA (ppm) | |
|---|---|---|
| (20 min Brabender) | 25 | 100 |
| 50 ppm AO | 8.00% | 4.00% |
| 250 ppm AO | 0.00% | −28.00% |

The use of a long-chained aliphatic hindered phenolic antioxidant can allow for as little as 50 ppm of the antioxidant

EXAMPLE 10 (ACCORDING TO THE INVENTION)

This example shows the benefits of using a partially hindered phenol along with DEHA in producing commercially acceptable PVC resins The use of ADDIOX 1045 (obtained from American Dispersion, Louisville, Ky.) produced the most heat stable resin compared to ADDIOX 1005 or ADDIOX 1016. Even at low ADDIOX 1045 concentration, the resin is more heat stable than the present commercial resin. The resin appears to maintain heat stability better using less DEHA and the best quality resin was produced using only 50 ppm 1045 and 25 ppm DEHA. In fact, the most heat stable resin is seen using low concentrations of both DEHA and the antioxidant.

| Effects of 1045 | DEHA (ppm) | |
|---|---|---|
| (20 min Brabender) | 25 | 100 |
| 50 ppm AO | −25.00% | 0.00% |
| 250 ppm AO | −14.29% | −7.14% |

The invention claimed is:

1. A process for the aqueous suspension polymerization of vinyl chloride, alone or as a mixture with less than 50% of another vinyl monomer, in the presence of a polymerization initiator comprising at least one compound chosen from dialkyl peroxydicarbonates, peroxy-tert-alkanoates and diacyl peroxides, wherein said process comprises employing a polymerization regulating agent comprising at least one mono- or di alkyl substituted N hydroxylamine having the formula:

HO—N—$R^1R^2$ wherein $R^1$ and $R^2$ may be the same or different, and are selected from H and $C_1$-$C_{12}$ hydrocarbons, where each hydrocarbon chain may be branched, unsaturated, or have hydrogen substituted with functional groups selected from —OH, —SO, benzyl, amino, mercapto, keto, carboxyl, or where $R^1$ and $R^2$ may form together a cyclic structure, with the proviso that at least one of $R^1$ and $R^2$ is different from H in the amount of 0.0005 to 0.02 parts by weight per 100 parts by weight of monomers, along with a totally or partially hindered phenolic antioxidant, wherein the antioxidant is chosen from butylated hydroxyanisole, butylated hydroxytoluene, 2,4-dimethyl-6-sec-hexadecylphenol, octadecyl 3-(3,5-di-tert-butyl-4-hydroxyphenyl)propionate, 2,6-di-tert-butyl-4-sec-butylphenol, 3,5-di-t-butyl-4-hydroxyhydrocinnamic acid $C_7$-$C_9$ alkylester and mixtures of 2,4-dimethyl-6-sec-hexadecylphenol and octadecyl 3-(3,5-di-tert-butyl-4-hydroxyphenyl)propionate.

2. The process according to claim 1, wherein the polymerization regulating agent comprises a dialkylhydroxylamine in which each alkyl radical comprises from 1 to 4 carbon atoms.

3. The process according to claim 2, wherein the polymerization regulating agent comprises diethylhydroxylamine.

4. The process according to claim 1, wherein the polymerization initiator comprises a dialkyl peroxydicarbonate in which each alkyl radical comprises from 1 to 16 carbon atoms.

5. A polymerization regulating agent for use in a process for the aqueous suspension polymerization of vinyl chloride, alone or as a mixture with less than 50% of another vinyl monomer, using a polymerization initiator which comprises at least one compound chosen from dialkyl peroxydicarbonates, peroxy-tert-alkanoates and diacyl peroxides, wherein said polymerization regulating agent comprises at least one mono- or di alkyl substituted N hydroxylamine having the formula:

$$HO-N-R^1R^2$$

wherein $R^1$ and $R^2$ may be the same or different, and are selected from H and $C_1$-$C_{12}$ hydrocarbons, where each hydrocarbon chain may be branched, unsaturated, or have hydrogen substituted with functional groups selected from —OH, —SO, benzyl, amino, mercapto, keto, carboxyl, or where $R^1$ and $R^2$ may form together a cyclic structure, with the proviso that at least one of $R^1$ and $R^2$ is different from H in the amount of 0.0005 to 0.02 parts by weight per 100 parts by weight of monomers, along with a totally or partially hindered phenolic antioxidant.

6. The polymerization regulating agent according to claim 5, wherein the polymerization regulating agent comprises a dialkylhydroxylamine in which each alkyl radical comprises from 1 to 4 carbon atoms.

7. The polymerization regulating agent according to claim 6, wherein the polymerization regulating agent comprises diethylhydroxylamine.

8. The polymerization regulating agent according to claim 5, wherein the antioxidant is chosen from butylated hydroxyanisole, butylated hydroxytoluene, 2,4-dimethyl-6-sec-hexadecylphenol, octadecyl-3-(3,5-di-tert-butyl-4-hydroxyphenyl)propionate, 2,6-di-tert-butyl-4-sec-butylphenol, 3,5-di-t-butyl-4-hydroxyhydrocinnamic acid $C_7$-$C_9$ alkylester and mixtures of 2,4-dimethyl-6-sec-hexadecylphenol and octadecyl-3-(3,5-di-tert-butyl-4-hydroxyphenyl)propionate.

9. The process according to claim 1, wherein the at least one mono- or di alkyl substituted N hydroxylamine is in the amount of 0.0005 to 0.01 parts by weight per 100 parts by weight of monomers.

10. The process according to claim 1, wherein the at least one mono- or di alkyl substituted N hydroxylamine is in the amount of 0.0025 to 0.02 parts by weight per 100 parts by weight of monomers.

11. The process according to claim 1, wherein the at least one mono- or di alkyl substituted N hydroxylamine is in the amount of 0.0025 to 0.01 parts by weight per 100 parts by weight of monomers.

12. The process according to claim 1, wherein the amount of the antioxidant is from 25 to 300 ppm.

13. The polymerization regulating agent according to claim 5, wherein the at least one mono- or di alkyl substituted N hydroxylamine is in the amount of 0.0005 to 0.01 parts by weight per 100 parts by weight of monomers.

14. The polymerization regulating agent according to claim 5, wherein the polymerization regulating agent is in the amount of 0.0025 to 0.02 parts by weight per 100 parts by weight of monomers.

15. The polymerization regulating agent according to claim 5, wherein the at least one mono- or di alkyl substituted N hydroxylamine is in the amount of 0.0025 to 0.01 parts by weight per 100 parts by weight of monomers.

16. The polymerization regulating agent according to claim 5, wherein the amount of the antioxidant is from 25 to 300 ppm.

* * * * *